United States Patent
George et al.

(10) Patent No.: US 11,666,851 B2
(45) Date of Patent: Jun. 6, 2023

(54) FILTER WITH PREFERENTIAL AIR FLOW

(71) Applicant: Parker-Hannifin Corporation, Cleveland, OH (US)

(72) Inventors: Jonathan Robert George, Laval (CA); Alfin Leo, Laval (CA)

(73) Assignee: Parker-Hannifin Corporation, Cleveland, OH (US)

( * ) Notice: Subject to any disclaimer, the term of this patent is extended or adjusted under 35 U.S.C. 154(b) by 1303 days.

(21) Appl. No.: 15/746,084

(22) PCT Filed: Aug. 2, 2016

(86) PCT No.: PCT/US2016/045170
§ 371 (c)(1),
(2) Date: Jan. 19, 2018

(87) PCT Pub. No.: WO2017/023936
PCT Pub. Date: Feb. 9, 2017

(65) Prior Publication Data
US 2018/0214808 A1     Aug. 2, 2018

Related U.S. Application Data

(60) Provisional application No. 62/200,253, filed on Aug. 3, 2015.

(51) Int. Cl.
*B01D 53/22*     (2006.01)
*B01D 46/62*     (2022.01)
(Continued)

(52) U.S. Cl.
CPC ......... *B01D 46/62* (2022.01); *B01D 46/0012* (2013.01); *B01D 46/121* (2022.01);
(Continued)

(58) Field of Classification Search
CPC ............ B01D 46/0023; B01D 46/0012; B01D 46/125; B01D 46/2411; B01D 2275/10; B01D 46/023
See application file for complete search history.

(56) References Cited

U.S. PATENT DOCUMENTS 3,386,232 A * 6/1968 Gaines, Jr. ............. B01D 46/02
                                                          55/500
3,710,948 A    1/1973 Sexton et al.
(Continued)

FOREIGN PATENT DOCUMENTS

JP     2005 152850 A     6/2005
WO    2015/002890 A1    1/2015

OTHER PUBLICATIONS

"Cartridge" The American Heritage Dictionary of the English Language, Fourth Edition copyright 2000 by Houghton Mifflin Company 1 page https://web.archive.org/web/20080514231526/https://www.thefreedictionary.com/cartridge (Year: 2000).*
(Continued)

*Primary Examiner* — Anthony R Shumate
(74) *Attorney, Agent, or Firm* — Renner, Otto, Boisselle & Sklar, LLP

(57) ABSTRACT

A filter element may include a primary layer of filter media defining a chamber having an open end and a closed end distally opposite the open end, and at least one secondary layer of filter media adjacently fixed to the primary layer of filter media. The at least one secondary layer of filter media may be located at the closed end of the primary layer of filter media for increasing a pressure drop at the closed end, such that fluid flow is homogeneously distributed through the chamber in response to the pressure drop. The primary layer of filter media is formed of a non-compressible material and may be tapered to further controlling pressure drops through
(Continued)

the chamber. A pocket filter assembly may include one or more filter elements disposed within a housing.

17 Claims, 6 Drawing Sheets

(51) Int. Cl.
*B01D 46/24* (2006.01)
*B01D 46/121* (2022.01)
*B01D 46/00* (2022.01)

(52) U.S. Cl.
CPC ......... *B01D 46/24* (2013.01); *B01D 46/2403* (2013.01); *B01D 46/2411* (2013.01); *B01D 2275/10* (2013.01)

(56) References Cited

U.S. PATENT DOCUMENTS

| | | | |
|---|---|---|---|
| 3,870,495 A | 3/1975 | Dixson et al. | |
| 4,064,876 A * | 12/1977 | Mulchi .................. | A62B 23/02 128/206.15 |
| 4,356,011 A * | 10/1982 | Day ....................... | B01D 46/02 55/368 |
| 5,667,544 A | 9/1997 | Haas et al. | |
| 5,785,725 A | 7/1998 | Cusick et al. | |
| 6,010,548 A | 1/2000 | Burkhead et al. | |
| 6,165,244 A | 12/2000 | Choi | |
| 6,258,142 B1 * | 7/2001 | Holt ................... | B01D 46/0001 210/486 |
| 6,387,144 B1 | 5/2002 | Jaroszczyk et al. | |
| 8,764,871 B2 | 7/2014 | Dralle | |
| 2003/0010698 A1 * | 1/2003 | Fritze .................. | B01D 35/306 210/235 |
| 2004/0141835 A1 | 7/2004 | Katayama et al. | |
| 2004/0163370 A1 * | 8/2004 | Haute ................... | B01D 46/002 55/483 |
| 2008/0072868 A1 | 3/2008 | Sasaki | |
| 2010/0058721 A1 * | 3/2010 | Wu ........................ | B01D 46/02 55/379 |
| 2012/0047855 A1 * | 3/2012 | Eyers ................... | B01D 46/002 55/378 |
| 2013/0019578 A1 * | 1/2013 | Dralle ................ | B01D 46/0023 55/485 |
| 2014/0237957 A1 * | 8/2014 | Kohn ................. | B01D 46/0023 55/341.1 |
| 2015/0008176 A1 | 1/2015 | Morgan, III | |
| 2015/0041380 A1 * | 2/2015 | Lin ........................ | B01D 29/21 210/188 |
| 2015/0151235 A1 * | 6/2015 | Lehman ............. | B01D 46/0021 55/300 |
| 2015/0202560 A1 | 7/2015 | Jarrier et al. | |
| 2015/0307365 A1 * | 10/2015 | Baird ...................... | G01M 3/04 210/236 |
| 2015/0336041 A1 * | 11/2015 | Hatfield ............. | B01D 46/0023 55/488 |
| 2016/0354719 A1 * | 12/2016 | Arrazola De Onate ..................... | B01D 46/002 |
| 2017/0216748 A1 * | 8/2017 | Hasenfratz ............. | B01D 46/12 |
| 2019/0118129 A1 * | 4/2019 | Parvin .................... | B01D 39/14 |
| 2019/0217229 A1 * | 7/2019 | Rookey ................. | B01D 35/30 |
| 2019/0321768 A1 * | 10/2019 | Englund .............. | B01D 46/023 |

OTHER PUBLICATIONS

Oxford English Dictionary, https://www.oed.com/view/Entry/69748?redirectedFrom=fiberglass#eid (accessed Nov. 14, 2022).*
International Search Report and Written Opinion for corresponding Patent Application No. PCT/US2016/045170 dated Nov. 18, 2016.
International Preliminary Report on Patentability for corresponding Patent Application No. PCT/US2016/045170 dated Nov. 7, 2017.

* cited by examiner

FILTER WITH PREFERENTIAL AIR FLOW

RELATED APPLICATIONS

This application is a national phase of International Application No. PCT/US2016/045170 filed Aug. 2, 2016 and published in the English language, which claims the benefit of U.S. Provisional Application No. 62/200,253 filed Aug. 3, 3015, which is hereby incorporated by reference.

FIELD OF INVENTION

The present invention relates generally to a device for separating contaminant particles from a fluid stream.

BACKGROUND OF THE INVENTION

Various applications require filtration for separating contaminant particles from a gaseous or other fluid stream. Filtration is generally performed using a filter that contains a filter media through which the contaminated gaseous stream flows. Different types of filters are available in the market and a specific type of filter may be more suitable in a particular application. For example, a pocket-type filter may be suitable for filtering engine combustion air in a locomotive. In a standard configuration, the pocket filter includes flat layers of filter media. The sides of the layers and one end of each of the layers are bonded together such that the layers form a pocket. The pocket filter may include one or multiple pockets extending in the depth direction commensurate with a direction of air flow. Multiple pockets may be provided to increase the dust-holding capacity of the filter, effectively increasing the lifespan of the filter.

The pocket filter may be used in applications where air travels through the filter at a high velocity. The high air velocity through the pocket filter may reduce filtration performance due to the air flow being unevenly distributed across the filter media. A large portion of the air flow may travel to the furthest depth of the filter such that the end of the layers may become overloaded by the air flow. The overload may lead to premature failure or a shortened lifespan of the filter.

SUMMARY OF THE INVENTION

The present application is directed towards providing a filter element that is configured to evenly distribute air flow across the filter media and effectively increase the lifespan of the filter. The filter element may be a pocket-type filter or a cartridge-type filter that includes a primary layer of filter media. The filter element may also include at least one secondary layer of porous and permeable media that is adjacently bonded to the primary layer at a furthest depth within the filter element. The secondary layer may be configured to increase a pressure drop within the depth of the filter element such that the pressure drop forces the air to be more evenly distributed across the filter media. The secondary layer may be configured to gradually decrease a pressure drop towards the inlet of the filter element. The primary layer of filter media may also be tapered at a predetermined angle to control the pressure drop.

According to an aspect of the invention, a filter element includes a primary layer of filter media defining a chamber having an open end and a closed end distally opposite the open end, the primary layer of filter media having an interior surface facing the chamber and an exterior surface opposite the interior surface, and at least one secondary layer of filter media adjacently fixed to the primary layer of filter media, the at least one secondary layer of filter media being located at the closed end of the primary layer of filter media for increasing a pressure drop at the closed end, wherein fluid flow is homogeneously distributed through the chamber in response to the pressure drop. At least the primary layer of filter media may be formed of a non-compressible material.

According to another aspect of the invention, a pocket filter element includes at least one pocket defined by walls formed of a primary filter media that are joined together at ends of the walls to form a closed end of the at least one pocket, and at least one insert formed of a secondary filter media adjacently fixed to the walls of the at least one pocket. The at least one insert is located at the closed end of the at least one pocket for increasing a pressure drop at the closed end and fluid flow is homogeneously distributed through the at least one pocket in response to the pressure drop. At least the primary filter media may be formed of a rigid material.

According to another aspect of the invention, a cartridge filter element includes a primary layer of filter media having a chamber with an open end and a closed end opposite the open end, and an interior surface that extends between the open end and the closed end and faces the chamber, and at least one secondary layer of filter media disposed on a portion of the interior surface within the chamber. The at least one secondary layer is located towards the closed end of the chamber for increasing a pressure drop at the closed end, such that fluid flow is homogeneously distributed through the chamber in response to the pressure drop. The primary filter media is formed of a rigid material.

According to another aspect of the invention, a pocket filter assembly includes a housing having a receiving end and a closed end opposite the receiving end, an outer filter media received within the housing through the receiving end, the outer filter media having layers of filter media with ends that are joined together to form a pocket end, and an inner filter media adjacently fixed to the outer filter media at the pocket end. The layers are angled relative to one another to taper the outer filter media towards the pocket end and the outer filter media may be formed of a rigid material that is non-compressible. Fluid flow is homogeneously distributed through the outer filter media in response to the layers of filter media being angled and the inner filter media.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
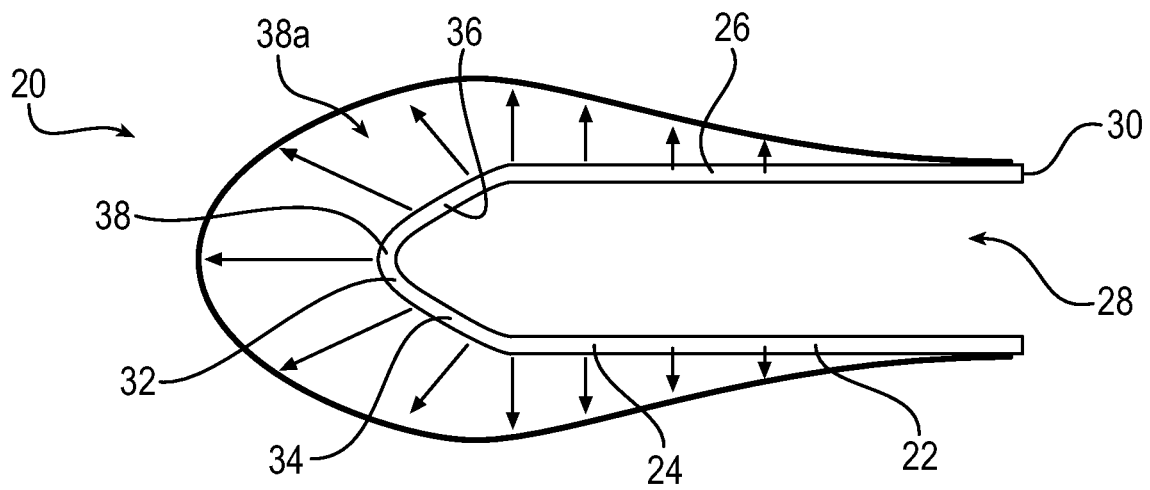
FIG. 1 is a schematic drawing depicting a sectional view of a pocket filter element having a primary layer of filter media.

The principles of the present application have particular application in pocket-type filters or bag filters for rail or locomotive applications. Other suitable applications may include any application using filter assemblies for large diesel engine combustion air, gas turbine or other power generation air filtration. The filter element according to the present application may be implemented in any suitable filter assembly. Pocket-type filters and cartridge-type filters are examples of suitable filter assemblies. The filter element may include a primary layer of filter media that defines a chamber with an open end and a closed end. The filter element may include at least one secondary layer of filter media that is adjacently bonded to the primary layer at the closed end for increasing a pressure drop at the closed end of the filter element such that fluid flow is evenly, or homogeneously distributed through the chamber in response to the pressure drop. At least the primary layer is formed of a non-compressible material.

Referring now to FIGS. 1-4, a sectional view of a pocket filter element 20 is schematically shown. As shown in the exemplary embodiments of FIGS. 1-4, the pocket filter element 20 includes a primary layer 22 of filter media. The primary layer 22 includes a first wall 24 and a second wall 26 that may be arranged parallel to one another to define a chamber 28 therebetween. The chamber 28 includes an open end 30, which may be a fluid inlet, and a closed end 32 distally opposite the open end 30. The closed end 32 may be in the form of a nose end of the chamber 28. The closed end 32 may be defined by the first wall 24 and the second wall 26 having end portions 34, 36 that are angled to join at a contact point 38 between the first wall 24 and the second wall 26 (see particularly reference numeral in FIG. 1). The first wall 24 and the second wall 26 maybe joined to form a pocket. The contact point 38 may be the furthest depth of the pocket filter element 20. The end portions 34, 36 of the walls 24, 26 may form a triangular shape at the closed end 32. In another exemplary configuration, the first wall 24 and the second wall 26 may be pleated such that each wall 24, 26 includes folded layers of filter media. The walls 24, 26 may be pleated to increase the surface area of the filter media and induce a lower velocity of air flow across the filter media.

In operation, contaminated air flows through the open end 30 of the pocket filter element 20 and into the chamber 28. The contaminated air is filtered by way of the filter media of the primary layer 22. The flow distribution of the air through the chamber 28 is shown by air flow profiles 38a, 38b, 38c in FIGS. 1, 2, and 4 respectively. As shown by the air flow profile 38a in FIG. 1, the air flow may travel at a high flow velocity through the chamber 28, such that a large portion of the air flow travels towards the furthest depth of the chamber 28, such as the contact point 38 at the closed end 32. The air flow may be unevenly distributed across the surface area of the filter media of the primary layer 22. As shown in FIG. 1, a smaller portion of the air flow travels through the filter media towards the open end 30 of the chamber 28.

Figure 2:
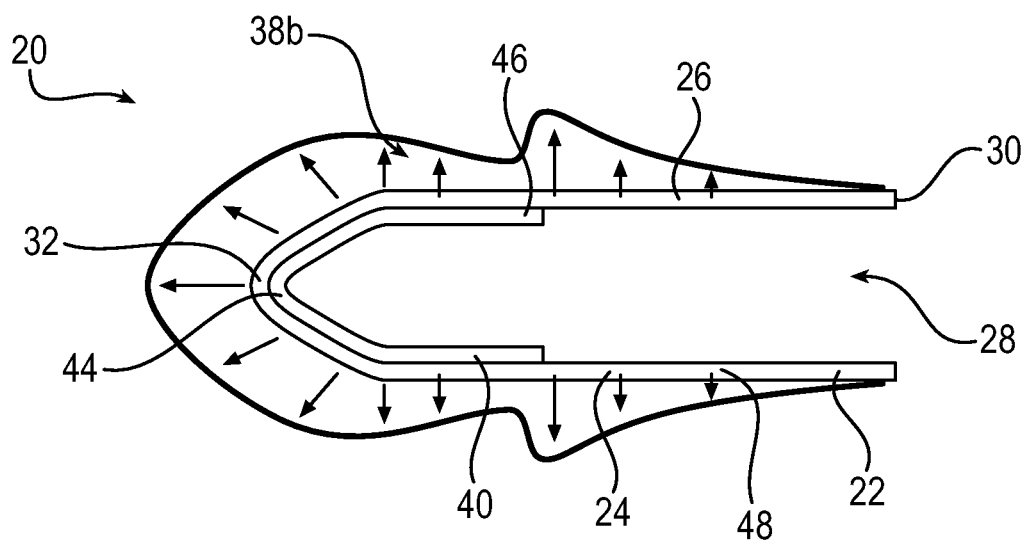
FIG. 2 is a schematic drawing depicting a sectional view of the pocket filter element of FIG. 1 with a secondary layer of filter media disposed on an interior surface of the primary layer.
Figure 3:
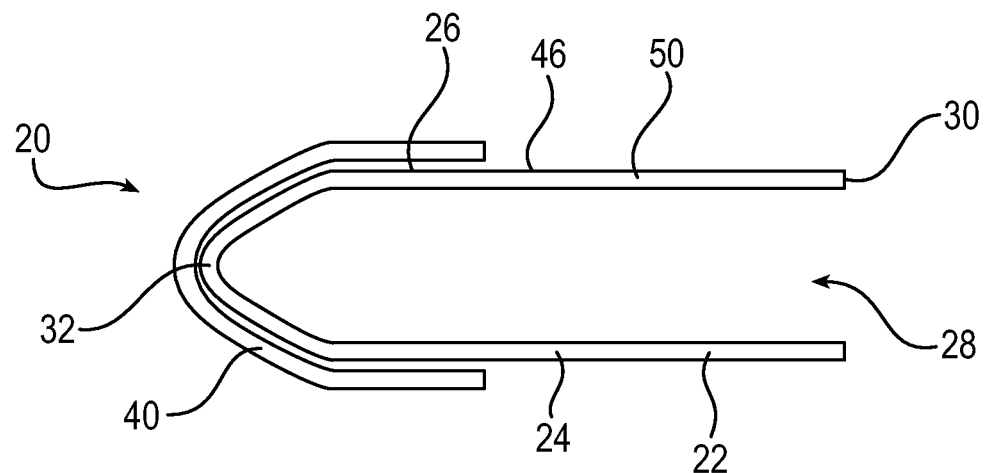
FIG. 3 is a schematic drawing depicting a sectional view of the pocket filter element of FIG. 1 with an additional layer of filter media disposed on an exterior surface of the primary layer.
Figure 4:
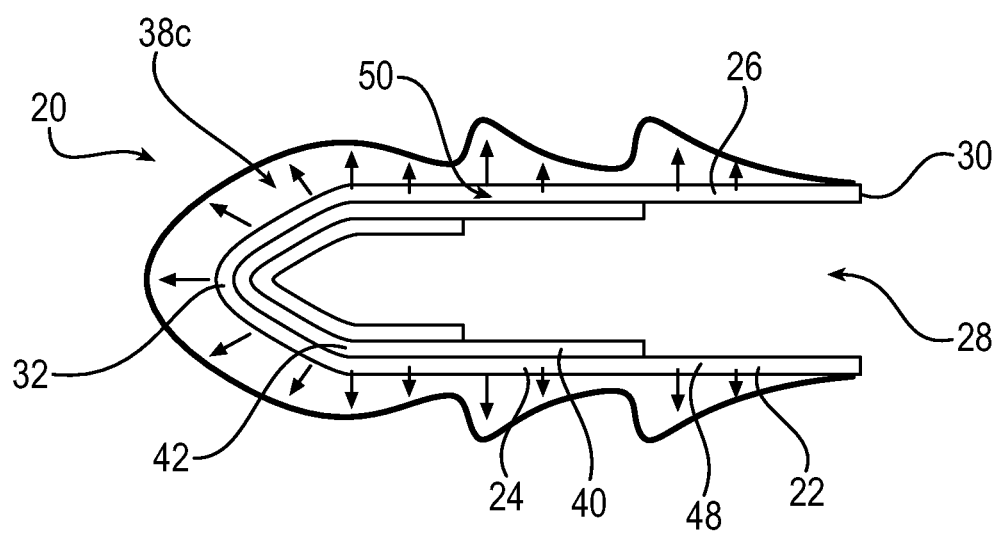
FIG. 4 is a schematic drawing depicting a sectional view of the pocket filter element of FIG. 1 with two secondary layers of filter media disposed within the primary layer.

As shown in FIGS. 2-4, the pocket filter element 20 may include at least one secondary layer 40, 42 of filter media that is adjacently bonded to the primary layer 22 of filter media. For example, the exemplary embodiments of FIGS. 2 and 3 include one secondary layer 40, and the exemplary embodiment of FIG. 4 includes two secondary layers 40 and 42.

The at least one secondary layer 40, 42 may be formed of a porous and permeable material and may be configured for controlling pressure drops through the chamber 28. For example, the at least one secondary layer 40, 42 may be located towards the closed end 32 of the primary layer 22 for increasing a pressure drop at the closed end 32. The pressure drop is the difference in pressure between the area within the chamber 28 and the area external to the chamber 28. The pressure drop occurs due to the frictional force that acts on the air flow as it flows through the chamber 28. Adding the at least one secondary layer 40, 42 decreases the pressure of the air flow acting on the closed end 32 of the chamber 28 by forcing the air flow to spread out across the surface area of the primary layer 22. Decreasing the pressure at the closed end 32 increases the difference in pressure between the area within the chamber 28 and the area external to the chamber 28. Thus, the secondary layer 40, 42 effectively increases the pressure drop at the closed end 32 of the chamber 28 and air flow is homogeneously distributed across the surface area of the primary layer 22 in response to the increased pressure drop.

The air flow profile 38b of FIG. 2 shows the air flow distribution in response to the secondary layer 40. The flow distribution may be increased at a terminating portion of the secondary layer 40 along the walls 24, 26 of the primary layer 22. The secondary layer 40 may be configured to gradually decrease the pressure drop towards the open end 30. Providing the at least one secondary layer 40, 42 adjacent to the primary layer 22 to increase the pressure drop at the end of the chamber 28 is advantageous in that the air flow through the pocket filter element 20 may be controlled to evenly distribute the air flow through the chamber 28. The shape and material of the at least one secondary layer 40, 42 may be selected to achieve a desired flow distribution profile through the primary layer 22. Evenly distributing the air flow across the area of the filter media prevents the end portion of the filter media from becoming worn out or ineffective due to a build-up of dust or other contaminants. Adding the secondary layer 40, 42 may increase the lifespan of the filter media and reduce overall operation costs by enabling filter media to be used for a longer period of time without replacement.

The at least one secondary layer 40, 42 may be configured as a removable insert that is insertable within the primary layer 22. The at least one secondary layer 40, 42 may be placed individually within the primary layer 22. The secondary layer 40, 42 may be inserted within the primary layer 22 during manufacturing of the filter element 20 and before the filter element 20 is implemented in a particular application. The configuration of the secondary layer 40, 42 may be selected in accordance with various characteristics of the pocket filter element 20. Examples of characteristics that may affect how the secondary layer 40, 42 is configured include the velocity of the air flow through the chamber 28, the orientation of the pocket filter element 20, the shape of the primary layer 22, the material of the filter media of the primary layer 22 or the secondary layer 40, and any other suitable characteristics that affect the performance of the filter as are known in the art. In an exemplary configuration, the at least one secondary layer 40, 42 may be attached, fixed or bonded to a portion of the length of the primary layer 22, such that the secondary layer 40, 42 extends along half the length of the walls 24, 26 of the primary layer 22, or less than half the length. The secondary layer 40, 42 may extend along any suitable length of the walls 24, 26, and the length may also be dependent on the thickness of the primary layer 22 and/or the secondary layer 40, 42. The at least one secondary layer 40, 42 may be complementary in shape to the primary layer 22. For example, the secondary layer 40 may have a closed end 44 and an open end 46, such that the secondary layer 40 is formed as a pocket inserted within the pocket defined by the primary layer 22.

As shown in FIG. 2, the secondary layer 40 may be adjacently fixed or bonded to the primary layer 22 on an interior surface 48 of the primary layer 22 that faces the chamber 28. The secondary layer 40 may be an inner filter media and the primary layer 22 may be an outer filter media. As shown in FIG. 3, the secondary layer 40 may be adjacently fixed or bonded to the primary layer 22 on an exterior surface 50 of the primary layer 22 that is opposite the interior surface 48, such that the secondary layer 40 is an outer filter media and the primary layer 22 is an inner filter media. The secondary layer 40 may have a thickness that is the same as the thickness of the primary layer 22. The thickness of the secondary layer 40 may be greater than or less than the thickness of the primary layer 22. The thickness of the secondary layer 40 may be selected to achieve a specific pressure drop. The thickness of the secondary layer 40 may be directly proportional to the pressure drop such that increasing the thickness of the secondary layer 40 may increase the pressure drop at the closed end 32 where the secondary layer 40 is located.

The filter media of the primary layer 22 and the secondary layer 40 may be formed of any suitable material. The filter media of the primary layer 22 may be formed of any suitable firm, stiff, rigid, or non-compressible material, such that the filter media of the primary layer 22 is non-compressible and non-expandable. The filter media of the secondary layer 40 may be formed of the same material as the filter media of the primary layer 22, or the secondary layer 40 may be formed of a material that is different from the primary layer 22. At least one of the primary layer 22 and the secondary layer 40 may be formed of a natural polymeric material or a synthetic polymeric material. Examples of suitable synthetic polymeric materials include polyester-based materials, nylon, and polypropylene. At least one of the primary layer 22 and the secondary layer 40 may be formed of a permeable foam material, such as a polyester foam. At least one of the primary layer 22 and the secondary layer 40 may be formed of a metal material or a metal alloy. Suitable metal materials may include aluminum, stainless steel, galvanized steel, and copper. Another suitable material for the secondary layer 40 may be fiber-reinforced plastic, such as fiberglass. The aforementioned materials are examples of suitable materials and the filter media of the primary layer 22 and the secondary layer 40 may be formed of many other types of material as may be suitable for any particular application.

The filter media of the primary layer 22 and the secondary layer 40 may be bonded or adhered together using any suitable process or method. The method may be dependent on the material or materials used for the primary layer 22 and the secondary layer 40. Examples of suitable bonding methods may include sewing, stapling, gluing, ultrasonic welding, or heat-based bonding methods. For example, in an exemplary configuration where the primary layer 22 is formed of a polyester-based material and the secondary layer 40 is formed of fiberglass, the secondary layer 40 may be sewn to the primary layer 22. Using fiberglass as the material for the secondary layer 40 is advantageous in that the primary layer 40 and the secondary layer 40 may be bonded together without using a gel or similar adhesive material. In another exemplary configuration where at least one of the primary layer 22 and the secondary layer 40 are formed of polypropylene, a hot-melt adhesive may be used to bond the layers together.

In still another exemplary configuration where both the primary layer 22 and the secondary layer 40 are formed of materials that are suitable for ultrasonic welding, ultrasonic welding may be used to bond the layers together. Ultrasonic welding may be suitable for bonding rigid plastic materials together, such as thermoplastic materials. Ultrasonic welding may also be suitable for bonding a suitable plastic material to a suitable metal material. For example, a filter media layer formed of aluminum and another filter media layer formed of polypropylene may be bonded together. Using ultrasonic welding is advantageous in that the layers may be bonded together without using solvents, adhesives, or other consumables. Another advantage to using ultrasonic welding is that the finished bond between the layers may be stronger and cleaner as compared with other bonding processes and methods. The aforementioned bonding methods are examples of suitable methods and other bonding methods may be used, depending on the material or materials of the primary and secondary layers 22, 40.

As shown in the exemplary embodiment of FIG. 4, the pocket filter element 20 may include a plurality of secondary layers 40, 42. For example, the pocket filter element 20 may include a first secondary layer 40 disposed on the interior surface 48 of the primary layer 22, as previously described. A second secondary layer 42 of filter media may be disposed on the interior surface of the first secondary layer 40, such that the first secondary layer 40 is interposed between the primary layer 22 and the second secondary layer 42. The second secondary layer 42 may be formed of any of the aforementioned materials and may be bonded to the first secondary layer 40 according to any of the aforementioned bonding methods. The second secondary layer 42 may be formed as an insert insertable within the first secondary layer 40, such that the second secondary layer 42 may be in the form of a pocket inserted within the pocket of the first secondary layer 40 that is inserted within the pocket of the primary layer 22. The second secondary layer 42 may have a shape that is complementary to the shape of the first secondary layer 40 and/or the shape of the primary layer 22. The second secondary layer 42 may extend along half the length of the walls of the secondary layer 40, or less than half the length of the secondary layer 40. The length of the second secondary layer 42 may be selected based on desired pressure drops through the chamber 28. As shown in FIG. 4, in the exemplary configuration where the pocket filter element 20 includes more than one secondary layer 40, the first secondary layer 40 may extend along more than half the length of the walls 24, 26 of the primary layer 22. The length of the first secondary layer 40 may be increased when the second secondary layer 42 is provided.

Providing an additional secondary layer 42 may be advantageous in that the secondary layers 40, 42 may be used to further control the pressure drop through the filter element 20. For example, adding two secondary layers 40, 42 at the closed end 32 may increase the pressure drop more than using a single secondary layer 40. The second secondary layer 42 may terminate at a point along the first secondary layer 40 that is less than the full length of the first secondary 40 such that an intermediate portion 50 of the chamber 38 is defined by the primary layer 22 and the first secondary layer 40. The pressure drop at the intermediate portion 50 may be less than the pressure drop at the closed end 32 and greater than the pressure drop towards the open end 30. Providing the secondary layers 40, 42 enables gradually decreasing the pressure drop towards the open end 30 for evenly distributing the air flow through the chamber 38.

Figure 5:
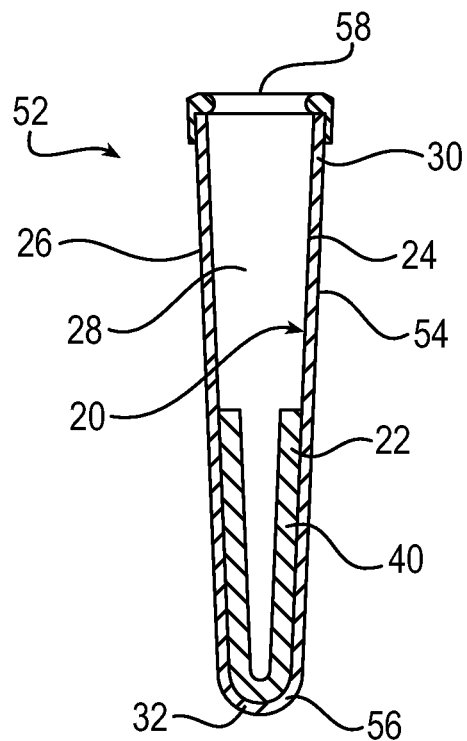
FIG. 5 is a drawing depicting a sectional view of a pocket filter assembly containing the pocket filter element of FIG. 1.
Figure 6:
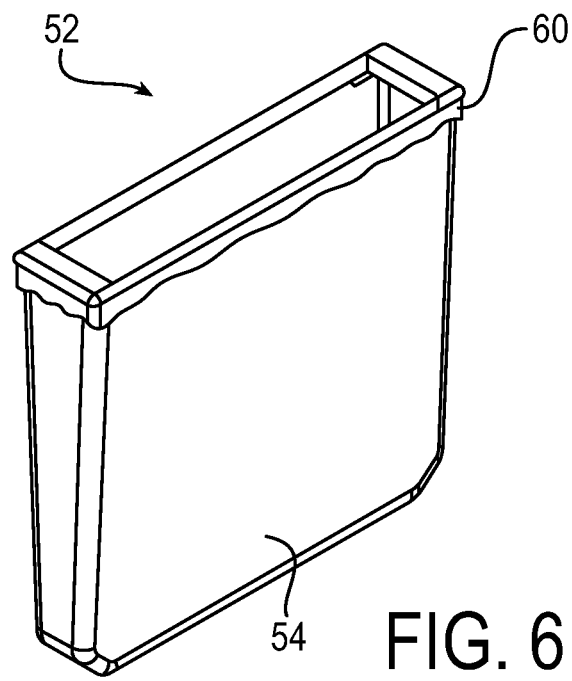
FIG. 6 is a drawing depicting an isometric view of the pocket filter assembly of FIG. 5.
Figure 7:
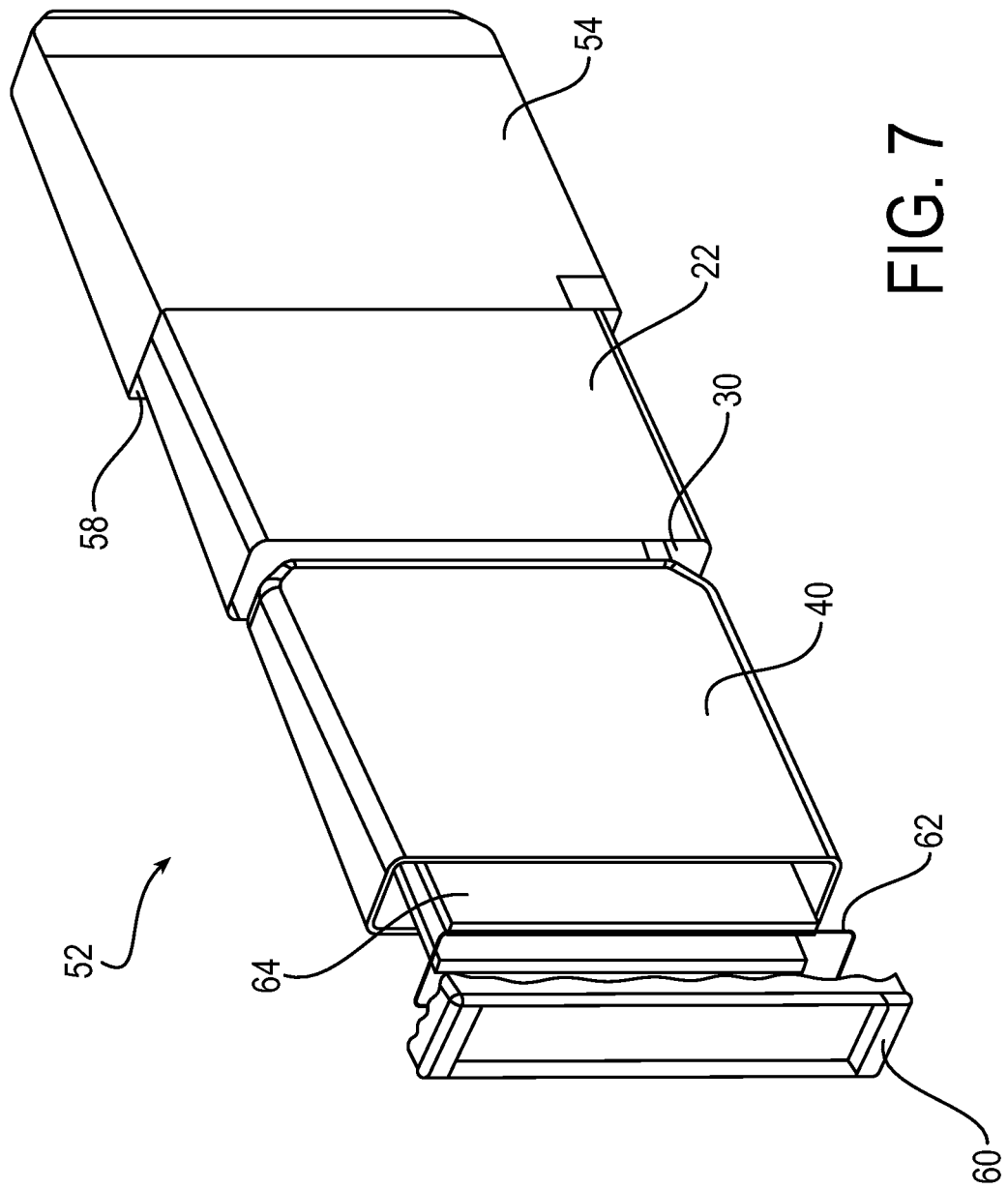
FIG. 7 is a drawing depicting an exploded isometric view of the pocket filter assembly of FIG. 6.

Referring now to FIGS. 5-7, an exemplary pocket filter assembly 52 containing the previously described filter element 20 is schematically illustrated. The pocket filter assembly 52 may include a housing 54 having a closed end 56 and a receiving end 58 opposite the closed end 56 (see reference numerals particularly of FIG. 5). The closed end 56 may be enclosed and the receiving end 58 may be an inlet, or an open end such that the primary layer 22 of filter media and the secondary layer 40 of filter media may be inserted into the housing 54 through the receiving end 58, and air may flow into the pocket filter assembly 52 through the open end 58. The filter element 20 may be configured as previously described, having the primary layer 22 of filter media, at least one secondary layer 40 of filter media, and the chamber 28. It will be appreciated that the housing 54 similarly may accommodate a filter element having additional secondary layers such as for example the secondary layer 42 of FIG. 4. As best shown in FIG. 5, the shape of the primary layer 22 may conform to the contour of the housing 54 and the shape of the secondary layer 40 may conform to the contour of the primary layer 22 and/or housing 54. The housing 54, the primary layer 22, and the secondary layer 40 may form a pocket within the pocket filter assembly 52.

The housing 54 may be tapered from the receiving end 58 towards the base end 56. The walls 24, 26 of the primary layer 22 may also be tapered from the open end 30 of the primary layer 22 towards the closed end 32. Using the walls 24, 26 of the primary layer 22 to taper the pocket is advantageous in further distributing the air flow evenly across the filter media of the primary layer 22. The angle between the walls 24, 26 may be selected to achieve desired pressure drops throughout the chamber 28. If the angle is not great enough, such as in the case where the walls 24, 26 are substantially parallel, air flow may travel to the furthest depth of the pocket. The thickness and configuration of the secondary layer 40 may also be selected in conjunction with selecting the angle between the walls 24, 26. Providing the secondary layer 40 and angling the walls 24, 26 of the primary layer 22 enables precise control of air flow through the chamber 28.

As best shown in FIGS. 6 and 7, the pocket filter assembly 52 may include a cuff member 60 having a perimeter that surrounds the receiving end 58 of the housing 54. The cuff member 60 is configured to hold the primary layer 22 of filter media and the secondary layer 40 within the housing 54. The cuff member 60 may have a portion that is engageable with the receiving end 58 of the housing 54 and the cuff member 60 may include a fabric material, such as canvas. As best shown in FIG. 7, the pocket filter assembly 52 may include a rigid member, such as for example a rigid wire header 62 that is insertable within the perimeter of the cuff member 60. The cuff member 60, the rigid member 62, and the receiving end 58 of the housing 54 may be rectangular in shape. The rigid wire header 62 may be configured to support the primary layer 22 against the cuff member 60 and may be formed of any suitable metal. The rigid wire header 62 may be positioned within the primary layer 22 and/or the secondary layer 40 at the open end such that the rigid wire header 62 constrains a top portion of the primary layer 22 against the cuff member 60. The pocket end of the primary layer 22 may be located within the depth of the housing 54 adjacent the closed end 56 of the housing. The pocket filter assembly 52 may also include rigid inserts 64 positioned within the primary layer 22 for rigidly supporting the walls of the primary layer 22 within the housing 54.

Figure 8:
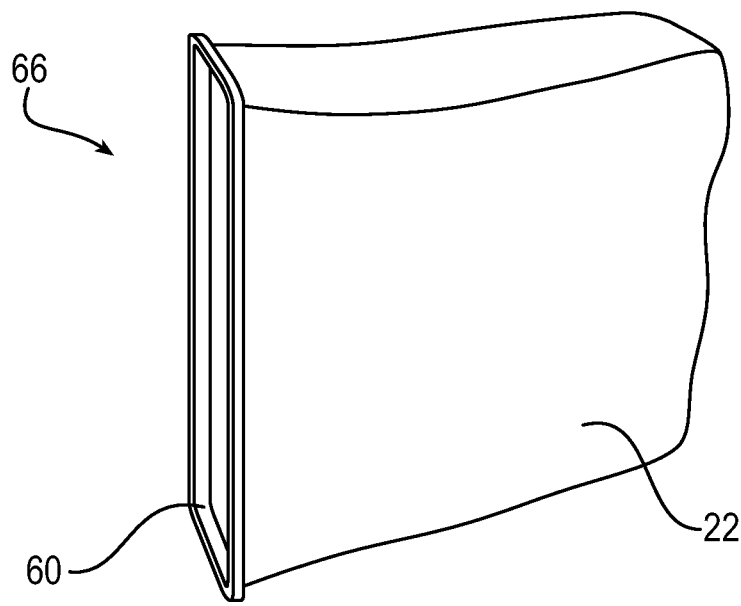
FIG. 8 is a drawing depicting an isometric view of a pocket filter element according to an exemplary embodiment.
Figure 9:
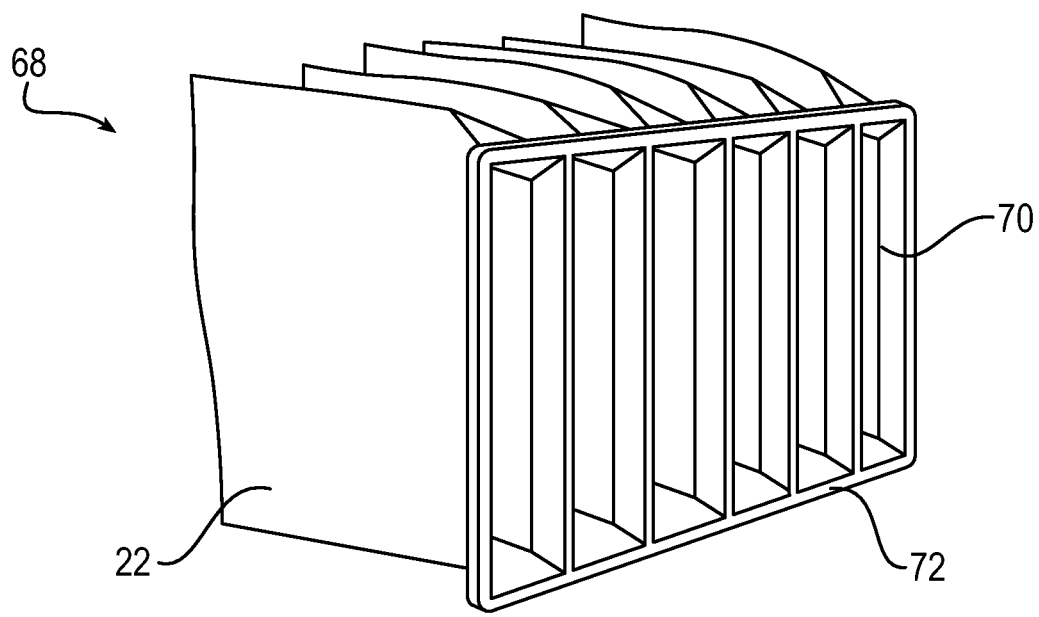
FIG. 9 is a drawing depicting an isometric view of a pocket filter element according to another exemplary embodiment.
Figure 10:
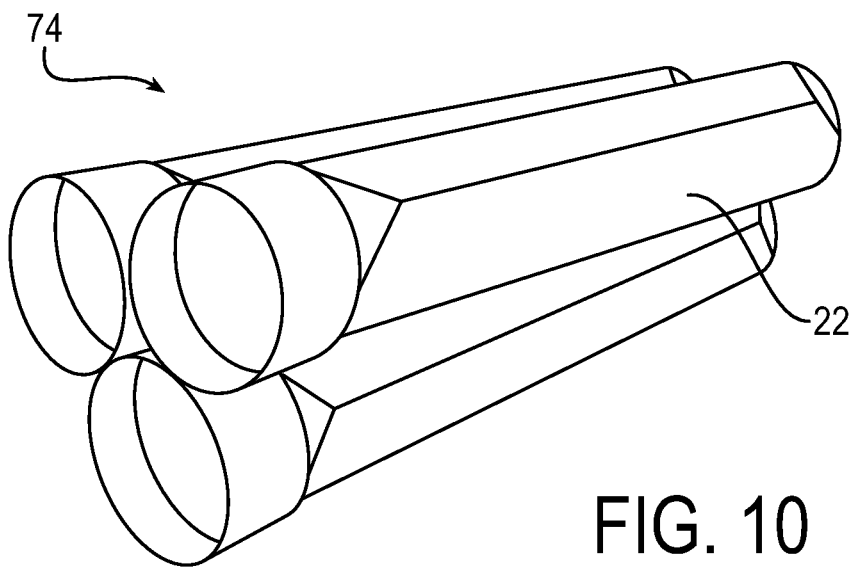
FIG. 10 is a drawing depicting an isometric view of a pocket filter element according to still another exemplary embodiment.

The pocket filter element described herein may be used in a suitable filter assembly, such as in a pocket-type filter assembly or a cartridge-type filter assembly. Other types of filters may also be suitable. FIGS. 8-10 are drawings showing examples of suitable pocket filter assemblies. As shown in the exemplary embodiment of FIG. 8, a suitable pocket filter assembly may be a rectangular face single pocket filter 66, such that the chamber, or pocket, formed by the primary layer 22 is rectangular in shape. FIG. 8 also shows the primary layer 22 attached to the cuff member 60. The rectangular face single pocket filter 66 may be suitable in various applications, such as for example, for filtering engine combustion air.

As shown in the exemplary embodiment of FIG. 9, a suitable pocket filter assembly may be a multiple pocket filter configuration 68 containing a plurality of primary layers 22 of filter media, as previously described. Each primary layer 22 forms a separate pocket. Each of the plurality of primary layers 22 may contain at least one insert, or secondary layer within the primary layer 22, as previously described. The multiple pocket filter configuration 68 may be suitable for various applications, such as for example in heating, ventilating, and air conditioning applications. The multiple primary layers 22 may be adjacently aligned such that the multiple pocket filter configuration 68 includes a plurality of openings 70, or inlets into chambers defined by the primary layers 22. Each primary layer 22 may have an end that is attached to a support frame 72 for holding the layers 22 within a suitable housing. The support frame 72 may be engageable with a housing and formed of a suitable rigid material, such as galvanized steel.

As shown in the exemplary embodiment of FIG. 10, a suitable pocket filter assembly may be a cylindrical pocket filter 74. The cylindrical pocket filter 74 may include a primary layer 22 of filter media and at least one secondary layer of filter media as previously described. The primary layer 22 may be cylindrical in shape and the secondary layer of filter media may also be cylindrical in shape. The cylindrical pocket filter 74 may be suitable in various applications, such as for example for dust collection.

Figure 11:
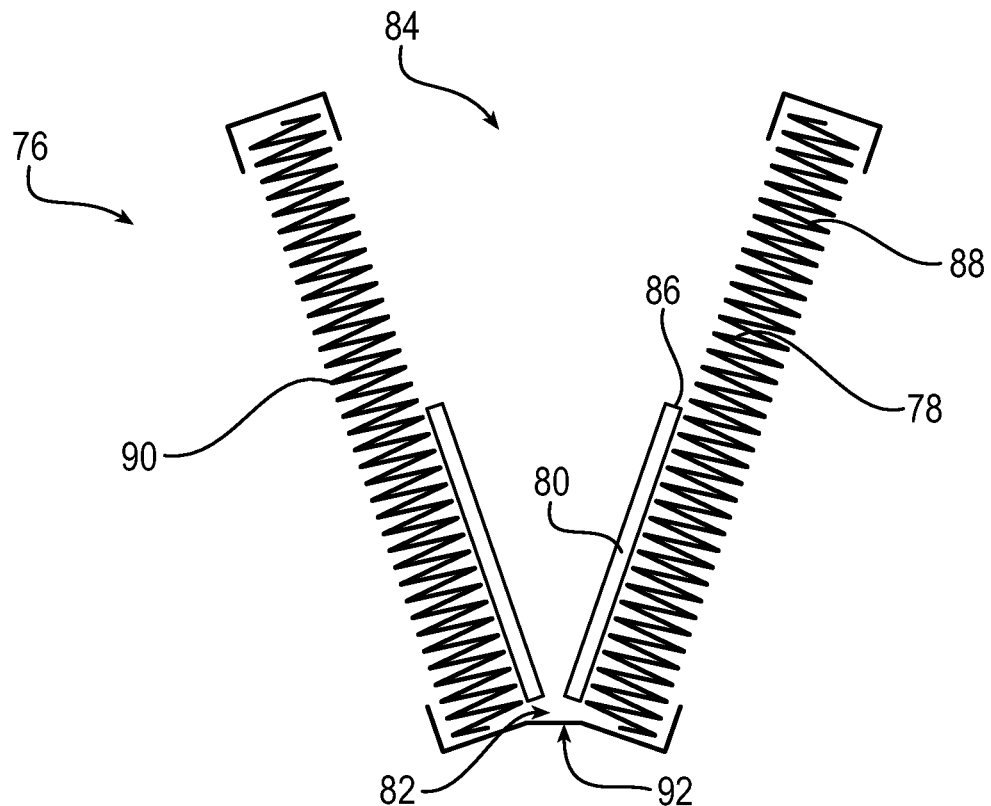
FIG. 11 is a schematic drawing depicting a sectional view of a cartridge filter element having an additional layer of filter media.

Referring now to FIG. 11, an exemplary embodiment of a cartridge-style filter element 76 is schematically shown. The cartridge-style filter element 76 includes a primary layer 78 of filter media and at least one secondary layer 80 of filter media. The primary layer 78 may include a chamber having a closed end 82 and an open end 84, or inlet distally opposite the closed end 82. The secondary layer 80 may be disposed on an interior surface 86 of the primary layer 78 within the chamber and towards the closed end 82 of the chamber. The secondary layer 80 may have a thickness that is less than a thickness of the primary layer 78. The secondary layer 80 may extend along a portion of the interior surface 86 to increase the pressure drop within the primary layer 78, such that fluid flow through the cartridge-style filter element 76 is homogeneously distributed across the surface area of the primary layer 78. The primary layer 78 may include walls 88, 90 of filter media. The walls 88, 90 may be pleated such that each wall 88, 90 includes multiple layers of filter media. The walls 88, 90 may be positioned at an obtuse angle 92 to one another, such that the primary layer 78 is in the form of a v-pack type filter. The primary layer 78 and the secondary layer 80 may be formed of any of the aforementioned materials and may be bonded to one another using any of the aforementioned bonding methods.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter element comprising:
   a primary layer of filter media defining a chanter having an open end and a closed end distally opposite the open end, wherein fluid flows inwardly through the open end and through the chamber toward the closed end, the primary layer of filter media having an interior surface facing the chamber and an exterior surface opposite the interior surface; and
   at least one secondary layer of filter media adjacently fixed to the primary layer of filter media and disposed along the interior surface of the primary layer of filter media, the at least one secondary layer of filtration being located at the closed end of the primary layer of filter media for increasing a pressure drop at the closed end, the at least one secondary layer of filtration extending along the interior surface from the closed end and having a terminating portion at a point along the interior surface, whereby outward fluid flow is increased at the terminating portion,
   wherein fluid flow is homogeneously distributed when flowing inwardly through the chamber from the open end to the closed end in response to the pressure drop;
   wherein at least the primary layer of filter media is formed of a rigid material and wherein the at least one secondary layer of filter media is porous and permeable; and
   wherein the at least one secondary layer of filter media has a thickness that is equal to or greater than a thickness of the primary layer of filter media.

2. The filter element according to claim 1, wherein the at least one secondary layer of filter media includes a first secondary layer of filter media and a second secondary layer of filter media, the first secondary layer having an inner face facing the chamber, and the second secondary layer disposed on the inner face of the first secondary layer.

3. The filter element according to claim 1, wherein the primary layer of filter media and the at least one secondary layer of filter media are formed of a same material.

4. The filter element according to claim 1, wherein at least one of the primary layer of filter media and the at least one secondary layer of filter media is formed of a polymeric material.

5. The filter element according to claim 1, wherein at least one of the primary layer of filter media and the at least one secondary layer of filter media is formed of a permeable foam material.

6. The filter element according to claim 1, wherein the primary layer of filter media is pleated.

7. The filter element according to claim 1, wherein the primary layer of filter media and the at least one secondary layer of filter media are ultrasonically welded together.

8. The filter element according to claim 1, wherein the filter element is a pocket filter element having at least one pocket defined by walls formed of the primary layer of filter media that are joined together at ends of the walls to form a closed end of the at least one pocket; and at least one insert is formed of the secondary layer of filter media.

9. The filter element according to claim 8, wherein the walls are angled relative to one another and the at least one pocket is tapered towards the closed end.

10. The filter element according to claim 8, wherein the at least one pocket is rectangular.

11. The filter element according to claim 8, wherein the at least one pocket is cylindrical.

12. The filter element according to claim 8, wherein the pocket filter element includes a plurality of pockets, each pocket formed of the primary layer of filter media and each pocket having the at least one insert formed of the secondary layer of filter media.

13. The filter element according to claim 1, wherein the filter element is a cartridge filter element.

14. The filter element of claim 13, wherein the primary layer of filter media includes walls of filter media, the walls being positioned at an obtuse angle to one another.

15. The filter element of claim 14, wherein the walls of filter media are pleated.

16. A pocket filter assembly comprising:
    filter element comprising:
      a primary layer of filter media defining a chamber having an open end and a closed end distally opposite the open end wherein fluid flows inwardly through the open end and through the chamber toward the closed end, the primary layer of filter media having an interior surface; and
      at least one secondary layer of filter media adjacently fixed to the primary layer of filter media and disposed along the interior surface of the primary layer of filter media, the at least one secondary layer of filtration being located at the closed end of the primary layer of filter media for increasing a pressure drop at the closed end, the at least one secondary layer of filtration extending long the interior surface from the closed end and having a terminating portion at a point along the interior surface, whereby fluid flow is increased at the terminating portion, wherein fluid flow is homogeneously distributed when flowing inwardly through the chamber from the open end to the closed end in response to the pressure drop;

wherein at least the primary layer of filter media is formed of a rigid material and wherein the at least one secondary layer of filter media is porous and permeable; and wherein the filter element is a pocket filter element having at least one pocket defined by walls formed of the primary layer of filter media that are joined together at ends of the walls to form a closed end of the at least one pocket and at least one insert is formed of the secondary layer of filter media;

a housing having a receiving end and a closed end opposite the receiving end for receiving the filter element;

a cuff member having a perimeter that surrounds the receiving end of the housing;

a rigid member within the perimeter of the cuff member configured to support the primary layer of filter media against the cuff member; and a rigid insert positioned within at least one of the primary layer of filter media and the secondary layer of filter media configured to support at least one of the primary layer of filter media and the secondary layer of filter media against the housing.

17. A filter element comprising:

a primary layer of filter media defining a chanter having an open end and a closed end distally opposite the open end, w herein fluid flows inwardly through the open end and through the chanter toward the closed end, the primary layer of filter media having an interior surface facing the chamber and an exterior surface opposite the interior surface; and at least one secondary layer of filter media adjacently fixed to the primary layer of filter media and disposed along the interior surface of the primary layer of filter media, the at least one secondary layer of filtration being located at the closed end of the primary layer of filter media for increasing a pressure drop at the closed end, the at least one secondary layer of filtration extending along the interior surface from the closed end and having a terminating portion at a point along the interior surface, whereby outward fluid flow is increased at the terminating portion, wherein fluid flow is homogeneously distributed when flowing inwardly through the chamber from the open end to the closed end in response to the pressure drop;

wherein at least the primary layer of filter media is formed of a rigid material and wherein the at least one secondary layer of filter media is porous and permeable; and wherein the primary layer of filter media and the at least one secondary layer of filter media are ultrasonically welded together.

* * * * *